US012776284B2

(12) United States Patent
Gao et al.

(10) Patent No.: US 12,776,284 B2
(45) Date of Patent: Oct. 27, 2026

(54) BACKLIGHT DRIVING SYSTEM AND METHOD, AND DRIVING MODULE

(71) Applicant: Silergy Semiconductor Technology (Hangzhou) LTD, Hangzhou (CN)

(72) Inventors: Shang Gao, Hangzhou (CN); Yu Cao, Hangzhou (CN); Pinxuan Zhao, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 0 days.

(21) Appl. No.: 19/231,788

(22) Filed: Jun. 9, 2025

(65) Prior Publication Data

US 2025/0384849 A1 Dec. 18, 2025

(30) Foreign Application Priority Data

Jun. 14, 2024 (CN) ......................... 202410768028.3

(51) Int. Cl.
*G09G 3/34* (2006.01)

(52) U.S. Cl.
CPC ....... *G09G 3/3406* (2013.01); *G09G 2370/10* (2013.01)

(58) Field of Classification Search
CPC ............. G09G 3/3406; G09G 2370/10; G09G 2370/00; G09G 3/342
See application file for complete search history.

(56) References Cited

U.S. PATENT DOCUMENTS

| | | | | |
|---|---|---|---|---|
| 10,356,824 | B2 | 7/2019 | Qiao et al. | |
| 2015/0161932 | A1* | 6/2015 | Kure | G09G 3/2007 345/102 |
| 2021/0233478 | A1* | 7/2021 | Sun | G09G 3/36 |
| 2021/0248966 | A1* | 8/2021 | Li | G09G 3/342 |
| 2022/0038305 | A1* | 2/2022 | Vivar | G06F 13/4282 |
| 2023/0179668 | A1 | 6/2023 | Lin et al. | |

* cited by examiner

*Primary Examiner* — Sahlu Okebato

(57) ABSTRACT

A backlight driving system can include: a master device and n slave devices, where the n slave devices comprise at least one first slave device and at least one second slave device; where the n slave devices are coupled to a same output port of the master device, or the n slave devices are coupled in series, and a same output port of the master device is coupled to a first one of the n slave devices to form a communication link; where each of the at least one first slave devices comprises m driving ports for driving at least one LED module, and each of the at least one second slave devices comprises k driving ports for driving at least one LED module; and where n, m and k are positive integers, and m is not equal to k.

20 Claims, 6 Drawing Sheets

BACKLIGHT DRIVING SYSTEM AND METHOD, AND DRIVING MODULE

RELATED APPLICATIONS

This application claims the benefit of Chinese Patent Application No. 202410768028.3, filed on Jun. 14, 2024, which is incorporated herein by reference in its entirety.

FIELD OF THE INVENTION

The present invention generally relates to the field of power electronics, and more particularly to backlight driving systems and methods, and associated driving modules.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
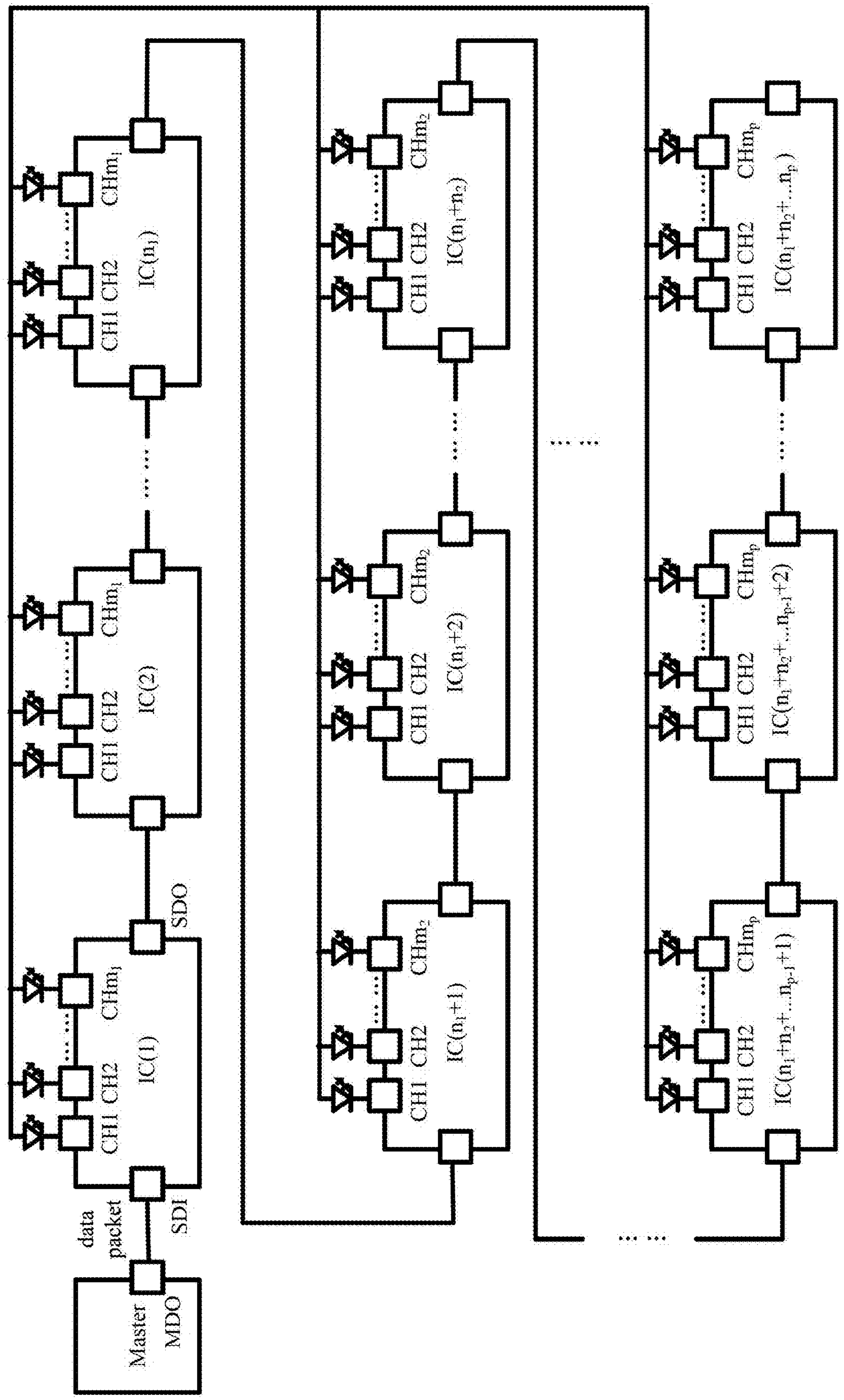
FIG. 1 is a schematic block diagram of a first example backlight driving system, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Liquid crystal display (LCD) apparatuses can include a backlight system. The backlight system can include light-emitting diodes (LEDs) and backlight driving chips. The LEDs can be driven by the backlight driving chips. A display screen may be divided into a plurality of regions, where each region corresponds to multiple LEDs, and these LEDs provide light source for this display screen region. Therefore, the LEDs of the backlight system can be divided into multiple partitions corresponding to the display screen regions. In some approaches, the number of partitions may be different in different backlight systems. The backlight driving chip may generally be a multi-channel chip. The multi-channel backlight driving chips can drive the corresponding LED partitions. In some approaches, the multi-channel backlight driving chips in the backlight system may have the same number of channels.

Since the backlight driving chips in such backlight systems have the same number of channels, some channels may be redundant. For example, if the backlight system has 10 LED partitions and three 4-channel backlight driving chips, two channels are redundant. If the backlight system has two 6-channel backlight driving chips, two channels are redundant. This redundancy can increase the cost of the overall backlight system.

Particular embodiments may provide a backlight driving system for driving a plurality of LED modules. The backlight driving system can include a master device and n slave devices, where n is a positive integer. The n slave devices can include at least one first slave device and at least one second slave device. The first slave device can include m driving ports for driving at least one LED module, where m is a positive integer. The second slave device can include k driving ports for driving at least one LED module, where k is a positive integer. For example, m is not equal to k, n is a positive integer greater than 1, m is a positive integer, and k is a positive integer.

In particular embodiments, the n slave devices can be coupled to a same output port of the master device such that the master device may communicate with the n slave devices simultaneously. The master device and n slave devices can communicate in a parallel communication manner or in a serial bus communication manner. In particular embodiments, the n slave devices can be coupled successively in series, whereby the first one of the n slave devices is coupled to the output port of the master device, and the master device and the n slave devices form a communication link. The master device and the n slave devices can communicate in a chained serial communication manner.

In particular embodiments, the n slave devices can be coupled to the same output port of the master device, and the n slave devices may be coupled successively in series, whereby the first one of the n slave devices is coupled to the same output port of the master device to form a communication link. Therefore, the master device and n slave devices can communicate in a parallel communication manner, or in a serial bus communication manner, or in a chained serial communication manner. The LED module can include one LED, or include a plurality of LEDs coupled in series and/or in parallel. Any suitable structure of the LED module, including LED modules that have the same structure or different structures, may be supported in certain embodiments.

In the backlight driving system of particular embodiments, the slave devices with the same number of driving ports (e.g., the same number of channels) may be regarded as slave devices of the same type, and different types of slave devices may have different number of driving ports. Any suitable number of types of the slave devices and the number of slave devices of each type can be employed in certain embodiments. The n slave devices can be coupled to the same output port of the master device, and/or the n slave devices may be coupled successively in series, whereby the first one of the n slave devices is coupled to a same output port of the master device to form a communication link. That is, the same output port of the master device can be coupled to the input port of at least one slave device. Thus, the master device can communicate with the n slave devices having different number of driving port through one output port of the master device.

The backlight driving system of particular embodiments can include at least two types of slave devices which have different number of driving ports (e.g., the different number of channels). By employing slave devices having different numbers of channels, the backlight driving system can drive a backlight system with any number of partitions, channel redundancy of some slave devices generated when the slave devices with the same number of channels is used in the backlight driving system may be avoided, the number of pins of printed-circuit board (PCB) can be reduced, the complexity of the layout of the PCB may be reduced, and the cost of the system effectively reduced. In addition, for communication data in the data packet in the communication process, the slave device having more channels may be compatible with the slave device having less channels. Therefore, it can be ensured that slave devices with different number of channels may be controlled by the same one output port of the master device, slave devices with different number of channels can be used together, the communication complexity may be reduced, the number of output ports of the master device can be reduced, the resource of ports of the master device may be saved, and the cost of the system further reduced.

Referring now to FIG. 1, shown is a schematic block diagram of a first example backlight driving system, in accordance with embodiments of the present invention. In this particular example, the backlight driving system can include a master device and n slave devices. The backlight driving system can be used for driving a plurality of LED modules. The n slave devices can include $n_1$ slave devices IC(1) through IC($n_1$), each having $m_1$ driving ports (e.g., channels) CH1 through CH$m_1$, $n_2$ slave devices IC($n_1$+1) through IC($n_1$+$n_2$), each having $m_2$ driving ports CH1~CH$m_2$, $n_i$ slave devices IC($n_1$+ . . . +$n_{i-1}$+1) through IC($n_1$+ . . . +$n_{i-1}$+$n_i$), each having $m_i$ driving ports CH1 through CH$m_i$, and $n_p$ slave devices IC($n_1$+ . . . +$n_{p-1}$+1) through IC($n_1$+ . . . +$n_{p-1}$+$n_p$), each having $m_p$ driving ports CH1 through CH$m_p$. For example, i is a positive integer greater than 2 and less than or equal to p, $n_i$ is an integer greater than or equal to 0, and p is a positive integer.

The master device and the n slave devices can be successively coupled in series to form a communication link, and an output port MDO of the master device may be coupled to the first one of the n slave devices. Each slave device can include data input port SDI and data output port SDO. Output port MDO of the master device can be coupled to data input port SDI of first slave device IC(1). Data input port SDI of each of the second slave device IC(2) to the last slave device IC($n_1$+ . . . +$n_{p-1}$+$n_p$) can be coupled to data output port SDO of the previous slave device in the communication link. In particular embodiments, data output port SDO of the last slave device IC($n_1$+ . . . +$n_{p-1}$+$n_p$) may not be coupled to a data input port of the master device. In other examples, data output port SDO of the last slave device IC($n_1$+ . . . +$n_{p-1}$+$n_p$) can be coupled to the data input port of the master device.

In one example, the LED modules corresponding to all of the slave devices may be powered by a same power supply voltage. In another example, the LED modules corresponding to the same type of slave devices may be powered by a same power supply voltage, and the LED modules corresponding to the different types slave devices can be powered by different power supply voltages. In particular embodiments, each LED module can include one LED. In other examples, each LED module can include multiple LEDs that are coupled in series and/or in parallel.

In particular embodiments, the n slave devices can communicate with the master device using the same communication protocol. In the communication process, the master device may send a data packet to one or more target slave devices. The target slave device may receive the data packet, and can perform corresponding actions according to communication data corresponding to the target slave device in the data packet. When the master device sends the data packet to one target slave device, the data packet can include one communication data. That is, the communication data in the data packet can correspond to this target slave device.

Figure 2:
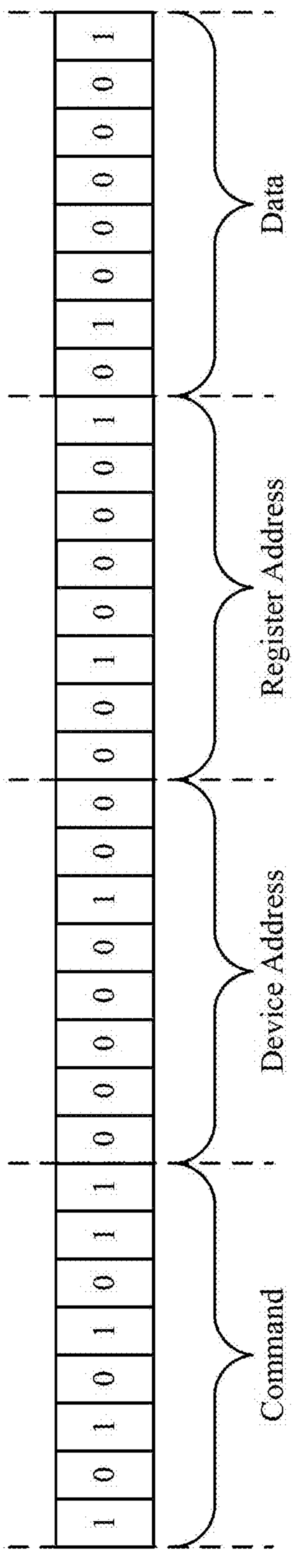
FIG. 2 is a diagram of example codes of a communications protocol, in accordance with embodiments of the present invention.
Figure 3:
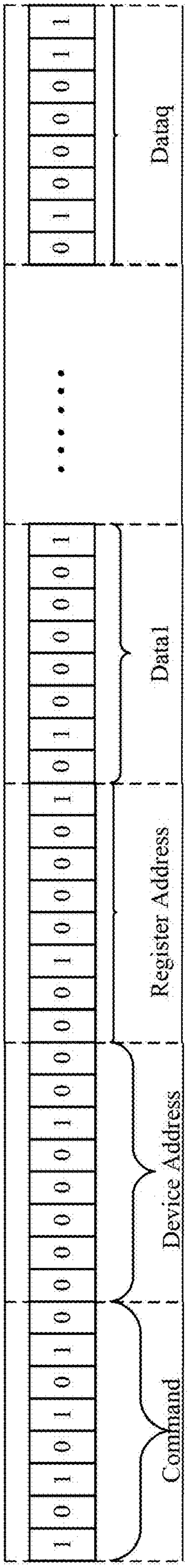
FIG. 3 is a diagram of example codes of another communications protocol, in accordance with embodiments of the present invention.

Referring now to FIGS. 2 and 3, shown are diagrams of example codes of a communications protocol, in accordance with embodiments of the present invention. In the example of FIG. 2, the data packet can include command data (Command), address data (Device Address), register address data (Register Address), and communication data (Data). The communication data can include data associated with the number of driving ports in the slave device, and the data associated with the number of driving ports of the slave device may be used for driving the LED module corresponding to the target slave device. When the master device sends a data packet to a plurality of target slave devices, the data packet can include a plurality of communication data, and each communication data can correspond to a respective one of the plurality of target slave devices.

In the example of FIG. 3, the data packet can include command data (Command), address data (Device Address), register address data (Register Address), and communication data (Data1 to Dataq), where q is a positive integer greater than or equal to 2. Each communication data Dataj can include data associated with the number of driving ports of the slave device, and the data associated with the number of driving ports of the slave device may be used for driving the LED module corresponding to the target slave device, where j is a positive integer, and $1 \leq j \leq q$. The data associated with the number of driving ports of the slave device in the communication data can be data associated with LED driving data. The data associated with the number of driving ports of the slave device can include one or more of: data for controlling LED brightness, data for controlling a delay time, and other LED control data.

In particular embodiments, the master device can communicate with the n slave devices in two communication manners. One example communication manner is the chained serial communication, whereby the slave devices successively receive the data packet and forwards the data packet to the next slave device. The other example communication manner is serial bus communication, whereby the data input port and the data output port of each slave device are coupled to each other. Therefore, the master device can be coupled to all of the n slave devices, and the master device can communicate with the n slave devices simultaneously. Regardless of chained serial communication or serial bus communication, for the communication data, the slave device with more channels can be backward compatible to the slave device with fewer channels.

In particular embodiments, when the master device communicates with the n slave devices in the chained serial communication manner, in each communication, the master device can send a data packet, and the slave devices may successively receive the data packet and forward the data packet to the next slave device. When the master device communicates with the n slave devices in the serial bus communication manner, multiple slave devices may receive the data packet simultaneously. In one example, all the slave devices may receive the data packet simultaneously. In another example, i slave devices may receive the data packet simultaneously, where i is a positive integer, and 2≤i≤n. If this communication is directed to one target slave device, the data packet can include one communication data. If the number of the target slave device in this communication is multiple, the data packet can include multiple communication data, and each communication data may correspond to one target slave device. Data associated with the number of driving ports of the slave device in the communication data can be encoded based on the number of driving ports in the slave device with the largest number of driving ports among the n slave devices.

When each driving port drives one LED module, a length of the data associated with the number of driving ports of the slave device can be greater than or equal to a product of a length of driving data corresponding to each driving port and the largest number of driving ports of the slave device among the n slave devices. When every p driving ports drive one LED module, a length of the data associated with the number of driving ports of the slave device may be greater than or equal to a product of a length of driving data corresponding to each driving port and a ratio of the largest number of driving ports of the slave device among the n slave devices to p, where p is a positive integer greater than 1.

In particular embodiments, the length of the data associated with the number of driving ports of the slave device in the communication data may be equal to the product of a length of driving data corresponding to each driving port and the largest number of driving ports of the slave device among the n slave devices, or the length of the data associated with the number of driving ports of the slave device in the communication data can be equal to the product of the length of driving data corresponding to each driving port and a ratio of the largest number of driving ports of the slave device among the n slave devices to p. In this example, if the target slave device is the slave device having the largest number of driving ports among the n slave devices, the data associated with the number of driving ports of the slave device may all be valid, and the target slave device can drive at least one LED module corresponding to the target slave device according to the data associated with the number of driving ports of the slave device. Also, if the target slave device is not the slave device with the largest number of driving ports among the n slave devices, the data associated with the number of driving ports of the slave device may be partially valid, and the target slave device can acquire valid data in the data associated with the number of driving ports of the slave device according to the number of driving ports of the target slave device to drive at least one LED module corresponding to the target slave device.

In particular embodiments, the length of the data associated with the number of driving ports of the slave device in the communication data can be greater than to the product of a length of driving data corresponding to each driving port and the largest number of driving ports of the slave device among the n slave devices, or the length of the data associated with the number of driving ports of the slave device in the communication data may be greater than the product of the length of driving data corresponding to each driving port and a ratio of the largest number of driving ports of the slave device among the n slave devices to p. In this example, regardless of whether the target slave device is the slave device with the largest number of driving ports among the n slave devices, the data associated with the number of driving ports of the slave device may be partially valid, the target slave device can acquire, according to the number of driving ports of the target slave device, valid data in the data associated with the number of driving ports of the slave device to drive at least one LED module corresponding to the target slave device.

In addition, the target slave device can drive at least one LED module corresponding to the target slave device according to the valid data in the data associated with the number of driving ports of the slave device in the communication data. When each driving port drives one LED module, the length of the valid data can be equal to a product of the number of driving ports of the target slave device and a length of the driving data corresponding to each driving port. When every p driving ports drive one LED module, the length of the valid data may be equal to a product of the length of the driving data corresponding to each driving port and a ratio of the number of driving ports of the target slave device to p.

The target slave device can mask part data of the data associated with the number of driving ports of the slave device in the communication data, or the target slave device can control part data of the data associated with the number of driving ports of the slave device in the communication data to be invalid. Alternatively, the target slave device may not acquire part data of the data associated with the number of driving ports of the slave device in the communication data, such that the length of the valid data in the data associated with the number of driving ports of the slave device in the communication data is equal to a product of a length of driving data corresponding to each driving port and the number of driving ports of the target slave device. In another alternative, the length of the valid data in the data associated with the number of driving ports of the slave device in the communication data can be equal to a product of a length of driving data corresponding to each driving port and a ratio of the number of driving ports of the target slave device to p.

In particular embodiments, the valid data can be configured as a beginning data segment of a first length in the data associated with the number of driving ports of the slave device in the communication data, and the first length may be equal to the length of the valid data. In another example, the valid data can be configured as an ending data segment of the first length in the data associated with the number of driving ports of the slave device in the communication data, and the first length may be equal to the length of the valid data. In another example, the valid data can be configured as a middle data segment of the first length in the data associated with the number of driving ports of the slave device in the communication data, and the first length may be equal to the length of the valid data.

Figure 4:
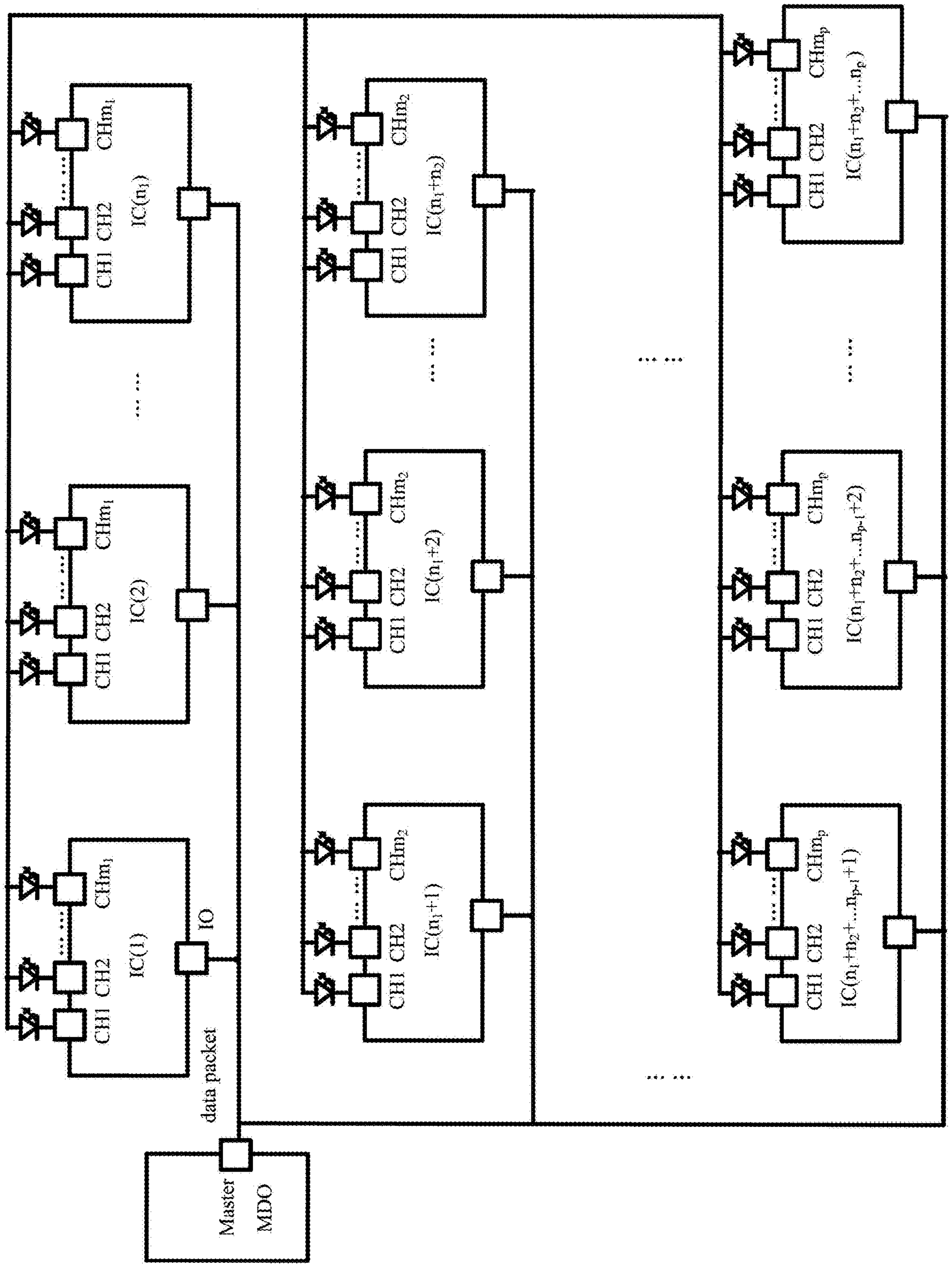
FIG. 4 is a schematic block diagram of a second example backlight driving system, in accordance with embodiments of the present invention.

Referring now to FIG. 4, shown is a schematic block diagram of a second example backlight driving system, in accordance with embodiments of the present invention. In this particular example, a same output port MDO of the master device can be coupled to each of the n slave devices, and the master device can communicate with the n slave devices in parallel. In particular embodiments, each slave device can include port IO, and output port MDO of the master device can be coupled to port IO of each slave device.

In the parallel communication mode, the communication data may satisfy the slave device having more channels being backward compatible with the slave device having less channels. In the communication process, the master device can send the data packet to one or more target slave devices, and each target slave device may receive the data packet and performs corresponding action according to the communication data corresponding to the target slave device in the data packet.

Multiple slave devices can receive the data packet simultaneously. In an example, all of the slave devices may receive the data packet simultaneously. In another example, i slave devices may receive the data packet simultaneously, where i is a positive integer, and i is greater than or equal to 2 and less than or equal to n. When the number of target slave device in this communication is one, the data packet can include one communication data. When the number of target slave devices in this communication is greater than one, the data packet can include multiple communication data, and each communication data can correspond one target slave device. Data associated with the number of driving ports of the slave device in the communication data may be encoded based on the largest number of driving ports of the slave device among the n slave devices.

Figure 5:
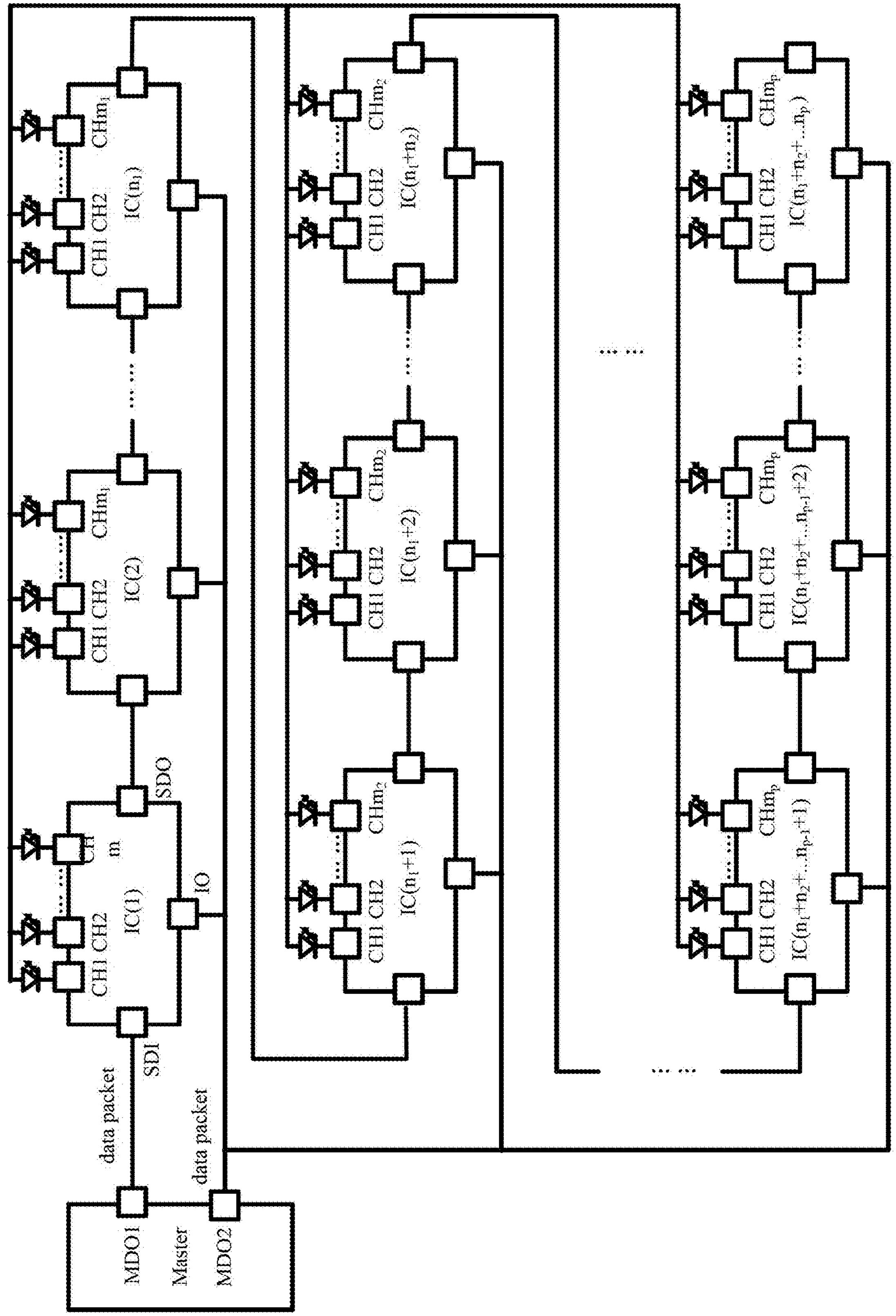
FIG. 5 is a schematic block diagram of a third example backlight driving system, in accordance with embodiments of the present invention.

Referring now to FIG. 5, shown is a schematic block diagram of a third example backlight driving system, in accordance with embodiments of the present invention. In this particular example, the n slave devices may be successively coupled in series, and output port MDO1 of the master device can be coupled to the first one of the n slave devices to form a communication link. Therefore, the master device and the n slave devices can communicate in a chained serial manner and a serial bus manner. In addition, the master device can be coupled to each of the n slave devices through one output port MDO2 of the master device, so the master device and the n slave devices can communicate in a parallel manner. In particular embodiments, data associated with the number of driving ports of the slave device in the communication data can be encoded according to the largest number of driving ports of the slave device among the n slave devices. When the master device communicates with the n slave devices in the chained serial manner and the serial bus manner, the communication process can be same as that in the first example described above. When the master device communicates with the n slave devices in the parallel manner, the communication process can be same as that in the second example discussed above.

Particular embodiments also provide a driving module including the above n slave devices. For example, each slave device can be an integrated circuit (IC) or chip. Particular embodiments can also provide a backlight driving method applied in the backlight driving system. In the first, second, and third examples and embodiments described herein, every two adjacent slave devices of n slave devices can be coupled through a single wire to perform single-wire communication. A multi-wire communication may also be applied to the above-described backlight driving method and system. In other embodiments, every two adjacent slave devices of the n slave devices can be coupled through multiple wires to communicate in other manners (e.g., inter-integrated circuit [I2C] communication, serial peripheral interface [SPI] communication, etc.).

Figure 6:
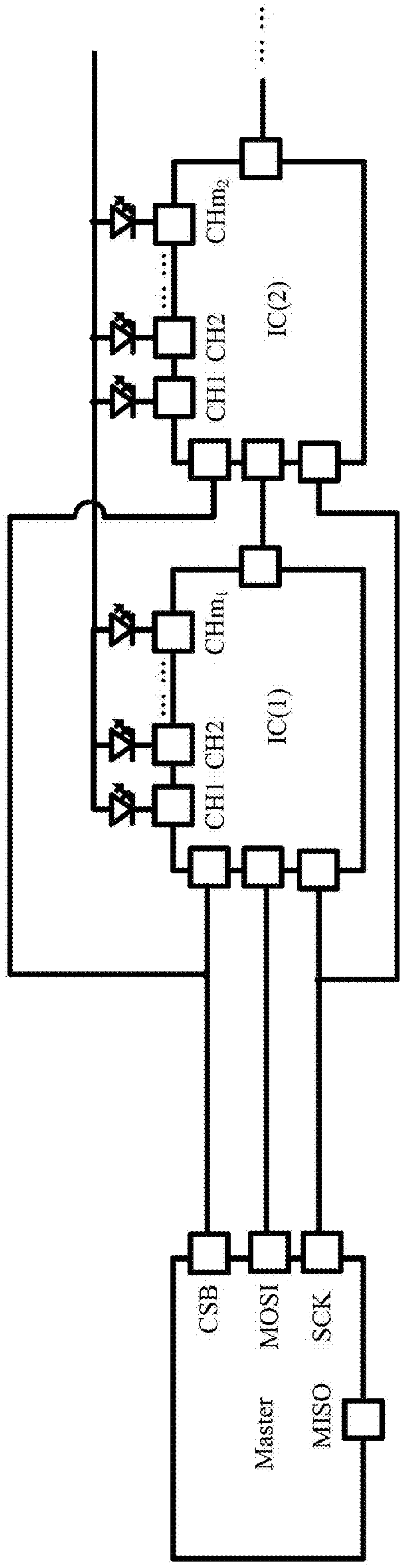
FIG. 6 is a schematic block diagram of a fourth example backlight driving system, in accordance with embodiments of the present invention.

Referring now to FIG. 6, shown is a schematic block diagram of a fourth example backlight driving system, in accordance with embodiments of the present invention. In this particular example, a serial multi-wire communication system can include one or more additional communication wires, as compared with the backlight driving system in the first example above. Alternatively, based on the second example, each slave device increases an additional port (e.g., a clock port), and the clock ports of all of the slave devices can be coupled to another output port of the master device. That is, a clock wire can be added, and a parallel multi-wire communication system obtained. Similarly, based on the third example above, an additional communication wire can be added to obtain a serial multi-wire communication system or a parallel multi-wire communication system.

In this way, particular embodiments may provide a more flexible backlight driving system, which can include slave devices having different number of channels. Multiple slave devices can be coupled in series to form a communication link, and the communication link may be coupled to the same output port of the master device. Alternatively, all the slave devices can be coupled to the same output port of the master device, and the master device may communicate with the slave devices in a same communication protocol. Since the backlight driving system of particular embodiments may include slave devices having different number of channels, channel redundancy of some multi-channel slave devices can be reduced or eliminated, the non-redundancy driving of the backlight system with any number of partitions may be achieved, channel redundancy of some slave devices generated when the multi-channel slave devices of the backlight driving system having the same number of channels can be avoided, the number of pins of PCB may be reduced, the complexity of the layout of PCB can be reduced, and the cost of the system effectively reduced.

In addition, for communication data in the data packet in the communication process, the slave device having more channels can be compatible with the slave device having less channels. Therefore, it can be ensured that slave devices with different number of channels can be controlled by the same output port of the master device, slave devices with different number of channels can be used together, the communication complexity may be reduced, the number of output ports of the master device may be reduced, the resource of ports of the master device can be saved, and the cost of the system further reduced.

In the backlight driving system of particular embodiments, the communication protocol, the encoding manner, and the register mapping of the slave device may be designed in a unified manner. Data associated with the number of driving ports of the slave device in the communication data in the data packet sent by the master device can be encoded according to the largest number of driving ports (e.g., the largest number of channels) of the slave device among the n slave devices. Therefore, the slave device without the largest number of ports may also recognize the data associated with the number of driving ports of the slave device in the communication data. Thus, the slave devices which have different number of channels and coupled in series and/or in parallel can perform communication in a unified communication protocol.

The embodiments were chosen and described in order to best explain the principles of the invention and its practical applications, to thereby enable others skilled in the art to best utilize the invention and various embodiments with modifications as are suited to particular use(s) contemplated.

It is intended that the scope of the invention be defined by the claims appended hereto and their equivalents.

What is claimed is:

1. A backlight driving system, comprising:

a) a master device and n slave devices, wherein the n slave devices comprise at least one first slave device and at least one second slave device;

b) wherein the n slave devices are coupled to a same output port of the master device, or the n slave devices are coupled in series, and a same output port of the master device is coupled to a first one of the n slave devices to form a communication link;

c) wherein each of the at least one first slave devices comprises m driving ports for driving at least one LED module, and each of the at least one second slave devices comprises k driving ports for driving at least one LED module; and d) wherein n, m and k are positive integers, and m is not equal to k.

2. The backlight driving system of claim 1, wherein:

a) in each communication, the master device sends a data packet, and the n slave devices receive the data packet simultaneously, or a slave device receives the data packet from a previous slave device or the master device and forwards the data packet to a next slave device;

b) the data packet comprises one or more communication data, and each communication data corresponds to a target slave device of the n slave devices; and c) the n slave devices comprise at least one slave device having a largest number of driving ports among the n slave devices, the communication data comprises data associated with a number of driving ports of the slave device, the data associated with the number of driving ports of the slave device being encoded based on the largest number of driving ports.

3. The backlight driving system of claim 2, wherein when each driving port drives one LED module, a length of the data associated with the number of driving ports of the slave device is greater than a product of a length of driving data corresponding to each driving port and the largest number of driving ports of the slave device among the n slave devices.

4. The backlight driving system of claim 2, wherein when each driving port drives one LED module, a length of the data associated with the number of driving ports of the slave device is equal to a product of a length of driving data corresponding to each driving port and the largest number of driving ports of the slave device among the n slave devices.

5. The backlight driving system of claim 2, wherein when p driving ports drive one LED module, a length of the data associated with the number of driving ports of the slave device is greater than a product of a length of driving data corresponding to each driving port and a ratio of the largest number of driving ports of the slave device among the n slave devices to p, wherein p is a positive integer greater than 1.

6. The backlight driving system of claim 2, wherein when p driving ports drive one LED module, a length of the data associated with the number of driving ports of the slave device is equal to a product of a length of driving data corresponding to each driving port and a ratio of the largest number of driving ports of the slave device among the n slave devices to p, wherein p is a positive integer greater than 1.

7. The backlight driving system of claim 2, wherein when the target slave device is a slave device having the largest number of driving ports among the n slave devices, the data associated with the number of driving ports of the slave device is all valid, and the target slave device drives at least one LED module corresponding to the target slave device according to the data associated with the number of driving ports of the slave device.

8. The backlight driving system of claim 2, wherein when the target slave device is not the slave device having the largest number of driving ports among the n slave devices, the data associated with the number of driving ports of the slave device is partially valid, and the target slave device acquires valid data in the data associated with the number of driving ports of the slave device according to the number of driving ports of the target slave device to drive at least one LED module corresponding to the target slave device.

9. The backlight driving system of claim 2, wherein the data associated with the number of driving ports of the slave device is partially valid, the target slave device acquires valid data in the data associated with the number of driving ports of the slave device according to the number of driving ports of the target slave device to drive at least one LED module corresponding to the target slave device.

10. The backlight driving system of claim 2, wherein:

a) the target slave device drives at least one LED module corresponding to the target slave device according to the valid data in the data associated with the number of driving ports of the slave device in the communication data; and b) when each driving port drives one LED module, a length of the valid data is equal to a product of the number of driving ports of the target slave device and a length of the driving data corresponding to each driving port, or when every p driving ports drive one LED module, the length of the valid data is equal to a product of the length of the driving data corresponding to each driving port and a ratio of the number of driving ports of the target slave device to p, wherein p is a positive integer greater than 1.

11. The backlight driving system of claim 10, wherein:

a) the target slave device masks part data of the data associated with the number of driving ports of the slave device in the communication data;

b) the target slave device controls part data of the data associated with the number of driving ports of the slave device in the communication data to be invalid; or c) the target slave device does not acquire part data of the data associated with the number of driving ports of the slave device in the communication data, d) such that the length of the valid data in the data associated with the number of driving ports of the slave device in the communication data is equal to a product of a length of driving data corresponding to each driving port and the number of driving ports of the target slave device, or the length of the valid data in the data associated with the number of driving ports of the slave device in the communication data is equal to a product of a length of driving data corresponding to each driving port and a ratio of the number of driving ports of the target slave device to p, wherein p is a positive integer greater than 1.

12. The backlight driving system of claim 11, wherein the valid data is configured as a beginning data segment of a first length in the data associated with the number of driving ports of the slave device in the communication data, or an ending data segment of the first length in the data associated with the number of driving ports of the slave device in the communication data, or a middle data segment of the first length in the data associated with the number of driving ports of the slave device in the communication data, and the first length is equal to the length of the valid data.

13. A driving module, comprising the n slave devices of claim 1, wherein each of the n slave devices comprises an integrated circuit.

14. A backlight driving method, applied in a backlight driving system comprising a master device and n slave devices, wherein the n slave devices comprises at least one first slave device and at least one second slave device, the method comprising:

a) coupling the n slave devices to a same output port of the master device, or coupling the n slave devices in series with a same output port of the master device being coupled to a first one of the n slave devices to form a communication link;

b) driving, by m driving ports of the at least one first slave device, at least one LED module;

c) driving, by k driving ports of the at least one second slave device, at least one LED module; and d) wherein n, m and k are positive integers, and m is not equal to k.

15. The method of claim 14, wherein:

a) sending, by the master device in each communication, a data packet, wherein the n slave devices receive the data packet simultaneously to communicate in a parallel communication manner or in a serial bus communication manner, or the slave device receives the data packet from a previous slave device or the master device and forwards the data packet to a next slave device to communicate in a chained serial communication manner;

b) wherein the data packet comprises one or more communication data, each communication data corresponding to a target slave device of the n slave devices; and c) wherein the n slave devices comprises at least one slave device having a largest number of driving ports among the n slave devices, the communication data comprises data associated with the number of driving ports of the slave device, and the data associated with a number of driving ports of the slave device is encoded based on the largest number of driving ports.

16. The method of claim 15, wherein when each driving port drives one LED module, a length of the data associated with the number of driving ports of the slave device is greater than or equal to a product of a length of driving data corresponding to each driving port and the largest number of driving ports of the slave device among the n slave devices.

17. The method of claim 15, wherein when every p driving ports drive one LED module, a length of the data associated with the number of driving ports of the slave device is greater than or equal to a product of a length of driving data corresponding to each driving port and a ratio of the largest number of driving ports of the slave device among the n slave devices to p, wherein p is a positive integer greater than 1.

18. The method of claim 15, wherein when the target slave device is the slave device having the largest number of driving ports among the n slave devices, the data associated with the number of driving ports of the slave device is all valid, and the target slave device drives at least one LED module corresponding to the target slave device according to the data associated with the number of driving ports of the slave device.

19. The method of claim 15, wherein when the target slave device is not the slave device having the largest number of driving ports among the n slave devices, the data associated with the number of driving ports of the slave device is partially valid, and the target slave device acquires valid data in the data associated with the number of driving ports of the slave device according to the number of driving ports of the target slave device to drive at least one LED module corresponding to the target slave device.

20. The method of claim 15, wherein:

a) the target slave device drives at least one LED module corresponding to the target slave device according to the valid data in the data associated with the number of driving ports of the slave device in the communication data; and b) when each driving port drives one LED module, a length of the valid data is equal to a product of the number of driving ports of the target slave device and a length of the driving data corresponding to each driving port, or when every p driving ports drive one LED module, the length of the valid data is equal to a product of the length of the driving data corresponding to each driving port and a ratio of the number of driving ports of the target slave device to p, wherein p is a positive integer greater than 1.

* * * * *